United States Patent [19]
Buelna

[11] Patent Number: 6,100,081
[45] Date of Patent: Aug. 8, 2000

[54] BIOFILTER FOR PURIFICATION OF WASTE WATERS AND METHOD THEREFOR

[75] Inventor: Gerardo Buelna, Quebec, Canada

[73] Assignee: Centre de Recherche Industrielle du Québec, Montréal, Canada

[21] Appl. No.: 09/114,078

[22] Filed: Jul. 6, 1998

[51] Int. Cl.$^7$ ........................................... A61L 9/01
[52] U.S. Cl. ...................... 435/266; 435/295.3; 210/150; 210/151; 210/290; 210/631
[58] Field of Search ................... 210/150, 151, 210/290, 631; 435/262, 262.5, 266, 289.1, 295.3

[56] References Cited

U.S. PATENT DOCUMENTS

| | | | |
|---|---|---|---|
| 4,086,167 | 4/1978 | Tapola et al. | 210/150 |
| 4,626,359 | 12/1986 | Bennett et al. | 210/793 |
| 4,662,900 | 5/1987 | Ottengraf | 55/90 |
| 4,997,568 | 3/1991 | Vandervelde et al. | 210/603 |
| 5,206,206 | 4/1993 | Buelna | 502/404 |
| 5,389,248 | 2/1995 | Pare et al. | 210/151 |
| 5,626,763 | 5/1997 | Mathews | 210/660 |

FOREIGN PATENT DOCUMENTS

| | | |
|---|---|---|
| 95/25695 | 9/1995 | WIPO . |
| 96/25366 | 8/1996 | WIPO . |

*Primary Examiner*—David A. Redding
*Attorney, Agent, or Firm*—Swabey Ogilvy Renault

[57] ABSTRACT

Apparatus for the purification of waste water and/or waste gas using a biofilter containing a filtering material, wherein the waste water move downwardly thereinto while the waste gas move upwardly or downwardly thereinto, is disclosed. Also disclosed is an apparatus for simultaneous purification of waste water and waste gas, comprising a filtering material comprised of a succession of layers. More conveniently, the apparatus comprises sufficient filtering material between the gas inlet and water outlet to ensure that the water coming out of the apparatus has not been substantially contaminated by the upwardly moving waste gas. In a preferred embodiment, the upper layer of filtering carrier material has a substantially lower filtration capacity than a lower layer of filtering carrier material, to prevent clogging of the filtering material upon downward flow of the waste water. Further disclosed is an apparatus for simultaneous purification of waste water as waste gas moving both downwardly. A filtering composition for purification of waste water and/or waste gas is also disclosed. Finally, the invention relates to an apparatus and a filtering composition for the purification of various types of waste water and waste gas.

48 Claims, 5 Drawing Sheets

BIOFILTER FOR PURIFICATION OF WASTE WATERS AND METHOD THEREFOR

BACKGROUND OF THE INVENTION i) Field of the Invention

This invention relates to a biofilter for purifying waste waters and/or waste gases, to a method of purification of waste waters and/or waste gases using same, and to a composition for the purification of waste waters and/or waste gases. The invention more specifically relates to a biofilter for the simultaneous purification of domestic, urban, industrial, or agricultural waste waters and waste gases via an organic fixed bed support which can be composted.

ii) Description of Prior Art

The potential of biofiltration for the purification of waste waters and waste gases has been recognized due to its efficacy and low cost. The organic support acts mainly at two levels: a) it can directly retain or fix different types of pollutants, and b) it can act as a support for various types of microorganisms capable of degrading the retained substances. The constituents of organic supports, lignin and organic acids in particular possess numerous functional polar groups conferring thereto a good absorption capacity for organic molecules as well as transition metals (Coupal et al., 1976, *Wat. Res.* 10: 1071–1076).

Although a number of treatment systems to control the discharge of pollutants have been disclosed, due to economic, climatic, or functional reasons and also due to their inherent complexities, they have unfortunately proven to lack versatility or practicality in a number of situations. Thus, versatile treatment systems that can be efficacious for the purification of waste waters having different particular characteristics (urban vs agricultural waste waters for example) have yet to be designed.

One of the organic support of choice is peat because it is a polar and highly porous material, in addition to being inexpensive and easy to use. Under natural conditions, peat adsorbs many undesirable elements and reduces their level from the environment (McLelland et al., 1986, *Internat. Peat J.* 1: 1–14; Couillard, 1994, *Wat. Res.,* 28: 1261–1274). In recent years there has been an increasing interest in the incorporation of peat into waste water or waste gas treatment systems. Peat removes pollutants and microbial activity from waste water by adsorption and absorption reactions. Peat has also been shown to be effective at removing suspended solids, nutrients, heavy metals, organic matter, oils, odors and bacteria (Couillard, 1994, *Wat. Res.,* 28: 1261–1274; the contents of which are incorporated herein by reference).

Several designs for peat filter beds to treat domestic waste water effluents have been developed and their construction is essentially similar (Couillard, 1994, *Wat. Res.,* 28: 1261–1274). They are usually composed of four layers: (from the bottom up) a layer of coarse gravel, a layer of sand, a layer of peat and finally, a layer of grass. The two bottom layers act as a support to retain the peat bed. However, these biofilters are reported as being limited to the treatment of small volumes of waste water disposal (Couillard, 1994, *Wat. Res.,* 28: 1261–1274).

Biofilters for the purification of waste gases have been disclosed for example in U.S. Pat. No. 4,662,900, to Ottengraf et al., which discloses a method of biologically filtering waste gases, by passing them through a layer of carrier material provided with an appropriate microorganism. The carrier material comprises material such as peat and wood chips. The biofilter described therein is a multi-chambered filter which comprises a pretreatment chamber that permits a spraying of the gases prior to their passage through the carrier material. Further U.S. Pat. No. 4,662,900 teaches that spraying water onto or into the carrier material is not sufficient to permit an adequate humidity control thereof. The incorporation of additional materials to the carrier material to prevent the aging thereof is also disclosed. These materials are mainly inert but can in addition comprise organic materials such as particles of car tires, ground lava bits and other non-composting materials.

Methods for the purification of waste waters and filters therefor have also been disclosed, for example in U.S. Pat. Nos. 4,461,708 to Hakulinen et al., and 4,561,974 to Bernard et al., U.S. Pat. No. 4,461,708 discloses a fluidized bed reactor, particularly suited to the wood-processing industry. The preferred procedure involves anaerobic and aerobic steps. The aerobic step involves a biofilter having a filtering material comprised in part of pieces of plastic. To produce aerobic conditions, air is conducted in the lower part of the biofilter, in close proximity to the water outlet. U.S. Pat. No. 4,561,974 on the other hand discloses an apparatus for the anaerobic filtration of waste water, with the filtering material comprising a plurality of vertically extending tubes or plates.

One apparatus and method for the simultaneous purification of air and water has also been disclosed in U.S. Pat. No. 5,080,793 to Urlings. In this patent, a complex filtering device is disclosed, in which air and water move upwardly in the first filtering unit. The carrier material providing support for microorganisms comprises small blocks and/or solid plates of porous polyurethane.

Although an organic support such as peat is an ideal biological filter material for water or gas waste treatment systems, this organic support often gets compacted, thereby significantly reducing the flow rate of the gas or water to be filtered. Methods of pre-treating peat to diminish the clogging problems of biofilters utilizing a peat mixture have been disclosed (Couillard, 1994, *Wat. Res.,* 28: 1261–1274). Nevertheless, the compaction and aging (shrinking, cracking, drying, and development of anaerobic zones) of the peat mixture is not significantly prevented. A continuous movement of the organic support to prevent this aging phenomenon has also been disclosed (U.S. Pat. No. 4,662, 900 and the references cited therein), but such a mixing is generally impractical.

Although various types of biofilters have been. designed in order to purify waste waters or waste gases there is still a need for a polyvalent biofilter that could simultaneously purify waste waters and waste gases. Further, the availability of a biofilter comprising a filtering material for the purification of waste waters and/or waste gases would be of advantage for the water treatment and gas treatment industries.

SUMMARY OF THE INVENTION

It is thus an object of this invention to provide an apparatus for the purification of waste water and waste gas which overcomes the disadvantages of the biofilters of the prior art.

It is a further object of this invention to provide an apparatus for the purification of waste waters and waste gases comprising a filtering material, which can be used to simultaneously purify waste water and waste gas of a variety of origin.

It is a still further object of this invention to provide an apparatus for the simultaneous purification of waste waters and waste gases having a filtering material which is solely comprised of organic material. In a preferred embodiment, this invention seeks to provide a filtering material which can be composted and which comprises a carrier material that improves the flow rate of the waste water and/or waste gas to be purified, and that increases the longevity and performance of the biofilter. In yet another embodiment, the invention seeks to provide a filtering material that provides support for appropriate microorganisms that degrade substances retained by the filtering material.

It is yet another object of this invention to provide a method for simultaneously purifying waste waters and waste gases by passing same on a biofilter.

It is still another object of this invention to provide an apparatus for the purification of waste gases. Alternatively, it is an object of the present invention to provide an apparatus for the purification of waste waters.

Additionally it is an object of the present invention to provide a filtering composition for the purification of waste waters and/or waste gases.

In accordance with one aspect of the invention there is provided an apparatus for the purification of waste waters and/or waste gases moving in opposed directions therethrough, wherein the waste gases containing oxygen.

The apparatus comprises a housing comprising bottom and side walls, a gas inlet located in a lower portion of the housing and a water inlet located in an upper portion thereof. The gas inlet is connected to a gas distributor means and the water inlet is connected to a water distributor means, the gas distributor means and water distributor means being located inside the housing. The apparatus further comprises a water outlet located below the gas inlet, and a gas outlet located in the upper portion of the housing. There is provided a filtering material contained inside the for providing adsorption, absorption, ionic exchange capacity, nutrients and support for colonization and growth of microorganisms. Gas is supplied through the gas inlet and rises through the filtering material while water moves downward therethrough. The filtering material is comprised of a succession of layers including at least one layer comprising a filtering carrier material and at least one layer comprising a structural carrier material in a sufficient amount to reduce compaction and creation of channels through which the waste water and/or waste gas can flow preferentially, thereby ensuring purification thereof.

Indeed, in a situation wherein the toxicity of the affluent increases, thereby diminishing the viability and/or growth of the microorganisms, the other physico-chemical properties would be expected to be maintained. Thus, the present invention permits a maintenance of a substantially constant purification efficiency of the effluent at all times.

In accordance with another aspect of the invention there is provided an apparatus for the purification of waste waters and/or waste gases moving downwardly therethrough, the gases containing oxygen. The apparatus comprises bottom and side walls, gas inlet and a water inlet located in an upper portion of the housing, the gas inlet and the water inlet being connected respectively to a gas distributor means and a water distributor means located inside the housing. The apparatus further comprises a water outlet and a gas outlet located in a lower portion of the housing. There is provided a filtering material contained inside the housing for providing adsorption, absorption, ionic exchange capacity, nutrients and support for colonization and growth of microorganisms. Gas and water are supplied respectively through the gas inlet and the water inlet and move downward through the filtering material, which is comprised of a succession of layers including at least one layer comprising a filtering carrier material and at least one layer comprising a structural carrier material in a sufficient amount to reduce compaction and creation of channels through which the waste water and/or waste gas can flow preferentially, thereby ensuring purification thereof.

In accordance with still another aspect of the invention there is provided a filtering composition for the purification of waste waters and/or waste gases. The filtering composition provides adsorption, absorption, ionic exchange capacity, nutrients and support for colonization and growth of microorganisms, and is comprised of a succession of layers including at least one layer comprising a filtering carrier material and at least one layer comprising a structural carrier material in a sufficient amount to reduce compaction and creation of channels through which the waste water and/or waste gas can flow preferentially, thereby ensuring purification thereof.

In accordance with still another aspect of the invention there is provided a method for filtering waste waters and/or waste gases. The method comprises he steps of: a) passing waste water and/or waste gas through a biofilter comprising a filtering material providing support for colonization and growth of microorganisms, wherein the filtering material is comprised of a succession of layers including at least one layer comprising a filtering carrier material and at least one layer comprising a structural carrier material in a sufficient amount to reduce compaction and creation of channels through which the waste water and/or waste gas can flow preferentially, thereby ensuring purification thereof; and b) withdrawing purified gas and/or water out of the biofilter.

DETAILED DESCRIPTION OF THE INVENTION

From the specification and appended claims it should be understood that the term filtering material is meant to include a variety of materials. In general, it is to be understood that the filtering material is usually composed of particles sized in order to provide a reasonable adsorbing and absorbing surface and an acceptable flow resistance.

From the specification and appended claims, it is to be understood that the term waste waters is designed to include but is not limited to industrial, agricultural and municipal waste waters. Examples of such waste waters include liquid effluents from composting centers; dairies; animal farms; including pig, cattle, horse, chicken, fox, mink and fish farms, canning factories; effluents from the pulp and paper industry, the chemical industry or the mining industry; slaughter house wastes; animal wastes; domestic sewage, and domestic septic tanks effluents. Furthermore, it is to be understood that the term waste gases should be taken in a broad sense so as to include, without being limited thereto, odor components; volatile organic and inorganic compounds or substances in general; organic conversion products; hydrocarbons, alcohols, aldehydes, ketones, esters, carboxylic acids, sulfurous and nitrogenous components; odorous effluents from animal farms such as pig and poultry farms ($H_2S$, ammonia); exhaust gases containing organic or inorganic compounds, for example exhaust gas combining a mixture of xylene, toluene and different alkenes.

From the specification and appended claims, the term pollutants should be taken in a broad sense so as to include metals, including heavy metals; organic compounds, ascetic or basic dies, oils, phenols, benzene, toluene, xylene, volatile organic compounds, carbonated aliphatic or cyclic compounds, chlorinated compounds, sulfated compounds, nitrated compounds, aldehydes and organic acids, nitrates, and phosphates; effluents from the pulp and paper industries; bacteria such as fecal coliforms; effluents from slaughter houses; domestic waste water treatment; nutrients; nitrogen; land field leachate treatment; hydrocarbons; pesticides; effluents from chemical industries; toxic waste; and odorous gases, such as dimethylamine, ammonia and hydrogen sulfides.

The term structural carrier material is meant to include organic compounds, but also inorganic compounds. In general, the structural carrier material should be chosen so that the particles thereof display a reasonable adsorbing surface as well as an acceptable flow resistance. Examples of structural carrier material include but are not limited to, wood shavings, wood chips, sawdust, bark, as well as inert materials such as plastic pellets or plastic tubes. Other structural carrier materials contemplated herein include, organic material such as polyethylene, polystyrene, particles of rubber, as well as inorganic materials such as fired clay particles, ground lava bits, ground coalcinder particles and perlite. Blends of the above listed structural carrier materials can be also used.

The term filtering carrier material is meant to include organic compounds, but also inorganic compounds. In general, the filtering carrier material should be chosen so that the particles thereof show grain size and porosity providing good adsorption and adsorption properties as well as an acceptable flow resistance, show good ionic exchange capacity properties and be capable of providing nutrients and support for colonization and growth of microorganisms. Examples of filtering carrier materials include but are not limited to organic materials such as peat and compost as well as inorganic materials such as active coal. Blends of the above listed filtering carrier materials can be also used.

In addition, the term microorganism is used in a broad sense and should be understood as referring mainly but not exclusively to bacteria and fungi. The pollutants to be removed by the biofiltration are adsorbed and absorbed by the filtration material and often converted by microorganisms into non-harmful substances such as $CO_2$ and $H_2O$. It should be understood that the microflora can be adapted to the type of pollutant to be removed from the waste waters and/or waste gases. It should also be understood that the filtration material might contain a microflora which is adapted for the purification of a particular pollutant or family thereof. In addition, inoculation of the filtering material will often take place naturally, the microflora contained in the substance to be filtered, inoculating the filtering material. The filtering material can also be inoculated by providing a selected inoculum to the biofilter. For example, the inoculum seeded in the biofilter can be a liquid or solid sample (from soil for example), known to contain microorganisms having been in contact with the pollutant which is to be purified. In addition, the filtering material of a functional biofilter, can be used as an inoculum to seed a second biofilter (for example, the inoculum can comprise 10% of the filtering material of the second biofilter).

Examples of microorganisms that can be used in the biofilters of the present invention include, but are not limited to, aerobic growth microorganisms such as *brahamella sp., streptomyces, pasteurella sp., achromobacter, xylosoxidans, pseudomonas strutzeri, penecillium sp.* and *bacillus sp., microccocus sp.* In some cases it might be beneficial to biostimulate the biofilter by providing nutrients thereto. For some purification applications, a portion of the biofilter can use microorganisms adapted for growing in anaerobic condition including, but not limited to Pseudomonas sp.and Bacillus sp., as will be later explained in more detail.

In a preferred embodiment, following the purification of waste waters and/or waste gases, the organic filtering material can be composted such that it can be used, if desired, as a fertilizer or the like. It should be understood however, that the composting of the filtration material and its use as a fertilizer, should be based on the type of pollutants that have been purified therein. For example, it would not be apparently advisable to use as a fertilizer a filtration material that had served to purify heavy metals. However, some toxic substances can be detoxified through biodegradation or mineralization. Thus, the biofilter material having served to purify these toxic substances, could still be used as a fertilizer. It should be understood that different methods to accelerate the composting of the filtration material are envisaged.

BRIEF DESCRIPTION OF DRAWINGS

Having thus generally describe the nature of the invention, reference will now be made to the accompanying drawing, showing by way of illustration, preferred embodiments thereof and in which.

DESCRIPTION OF PREFERRED EMBODIMENTS

Figure 1:
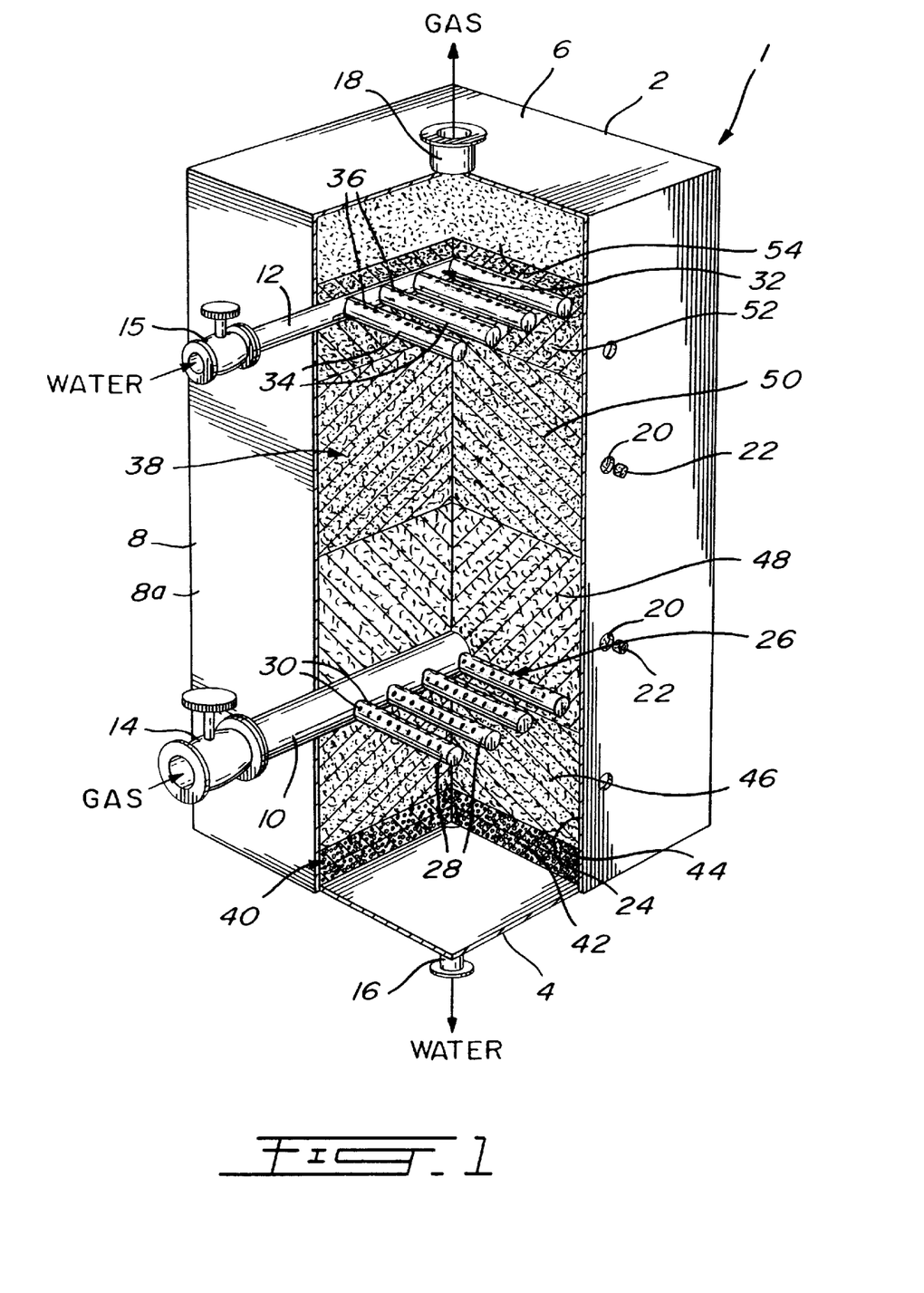
FIG. 1 shows a fragmentary perspective view of a first preferred embodiment of a biofilter for the purification of water and gas according to the present invention.

Referring now to FIG. 1 there is shown a biofilter 1 comprising a housing 2, the housing having a bottom wall 4, a top wall 6 and side walls 8. The side wall 8a is provided with a gas inlet pipe 10 in its lower portion, and a water inlet pipe 12 in its upper portion. The gas inlet pipe 10 and water inlet pipe 12 are provided with a valve 14 and 15, respectively. The bottom wall 4 of the housing 2 is provided with a water outlet pipe 16. The top wall 6 is provided with a gas outlet pipe 18. The side walls 8 are also provided with openings 20 sealed with removable caps 22, the opening permitting access to the inside portion 24 of the housing 2.

The gas inlet tube 10 communicates with a gas distributor 26, inside the housing 24, the gas distributor 26 having branches 28 provided with perforations 30 that are oriented towards the upper portion of the biofilter 1, thereby facilitating the circulation of the gas therein. In the preferred embodiment depicted in FIG. 1, two rows of perforations 30 are present on the gas distributor branches 28, the rows of perforations 30 being at a 30° angle from the vertical plane of the branches 28. The gas distributor branches 28 have a diameter which is smaller than that of the gas inlet pipe 10, to minimize the pressure load drop. The gas distributor branches 28 are further provided with a smaller number of perforations 30 that are substantially downwardly oriented, to oxygenate a lower layer 46, as will be explained later in more detail.

The water inlet pipe 12 is connected to a water distributor 32 having protruding branches 34 provided with perforations 36 located on the upper portion of the branches 34, thereby ensuring that only the overflow of water entering the branches 34 will pass through the perforations 36 and into the filtering material 38.

The filtering material 38 present inside the housing 2 rests on stones 40 arranged in two layers. In the first layer 42, in contact with the bottom wall 4, the stones have a diameter of approximately 9 mm while in the second layer 44 on top of layer 42, the stones have a diameter of approximately 6 mm.

The first layer of the filtering material 46 rests on the second layer of stones 44, and is composed of a mixture of peat and wood shavings. The second, third and fourth layers of filtering material, 48, 50 and 52, are comprised of wood shavings, wood shavings and peat and wood shavings and coniferous bark, respectively. Also present in the preferred embodiment depicted in FIG. 1, above the water distributor 32, and comprising the upper most layer 54 of the filtering material 38, is a layer of coniferous bark, preferably coniferous bark and peat. The upper most layer 54 acts as an insulator and deodorizer.

In operation, waste gas is provided through the gas inlet pipe 10 and after passing through the perforations 30 of the gas distributor 26, most of the waste gas will rise inside the housing 2, thereby passing through layers 48, 50, 52 and 54 of the filtering material 38. A smaller quantity of waste gas will flow down through perforations 30 in a sufficient amount to oxygenate the lower layer 46 to provide aerobic condition required for colonization and growth of microorganisms.

The waste water flows through the water inlet pipe 12, and reaches the filtering material 38 after passing though the perforations 36 of the water distributor branches 34. The perforations 36 being located on the upper portion of the branches 34 of the water distributor 32, ensures that the water distributor 32 remains relatively full at all times, thereby ensuring a more homogenous control of the humidity of the filtering material 38 and also permitting a more homogenous flow of water in the system leading to the water inlet pipe 12 and water distributor 32. The water percolating by gravity from the perforations 36 of the water distributor 32 is purified through the filtering material 38 by way of adsorption, absorption and biodegradation. The waste water also provides the humidity and nutrients required for the optimum activity of the biofilter 1, as it contributes the necessary humidity and nutrients for the activity of the microorganisms colonizing the filtering material 38. In addition, the humidity of the biofilter 1 can dissolve water-soluble substances present in the gases passing through the filtering material 38, thereby enhancing the efficiency of the purification of the waste gases.

The first layer of filtering material 46, is composed of a filtering carrier material comprised of peat and wood shavings and acts as a filtering layer for capturing condensation of polluting matter contained in waste gas and for retaining suspended and dissolved polluting matter contained in waste water, to ensure that the water reaching the water outlet pipe 16 has been substantially purified even though it might have been contaminated by incoming waste gases. A sufficient amount of filtering material is present in layer 46 to provide filtering of waste gas passing through lower perforations 30', so that the residual gas leaving the biofilter with the purified water through outlet 16 has been also purified. The structural carrier material such as coniferous bark and wood shavings acts as a support material for colonization and growth of microorganisms, permitting a more even distribution of waste gases and waste water throughout the filtering material 38, preventing packing thereof and delaying the aging thereof.

Table 1 gives examples of biofilter composition data for each layer 46, 48, 50, 52 and 54 in terms of volume percentage ranges of constituents and thickness ranges for corresponding layers, which are applicable to filtering of water and gas or water only.

TABLE 1

| Biofilter composition -water and gas -water only | Peat (volume %) | Wood Shavings (volume %) | Barks (volume %) | Thickness (cm) |
|---|---|---|---|---|
| fifth layer | 0–50 | 0–50 | 0–100 | 20–50 |
| fourth layer | — | 0–100 | 0–100 | 10–20 |
| third layer | 20–50 | 50–80 | — | 30–60 |
| second layer | — | 100 | — | 10–40 |
| first layer | 50–70 | 30–50 | — | 10–30 |

For each layer, any combination of volume percentage of constituents falling within the given ranges can be used to obtain a total 100% volume for that layer. It can be seen from Table 1 that peat or wood shaving can be added to bark to obtain the layer 54. It can also be seen that volume percentage range for peat in third layer 50 is lower than volume percentage range for peat composing first layer 46. That volume percentage gradient, which results in a filtering capacity gradient, is provided to improve waste water filtering efficiency while maintaining acceptable overall filtering capacity by reducing clogging which could otherwise occurs following extended operation of the biofilter. Applicant's experience has shown that high percentage of suspended solids present in incoming waste water may lead to premature clogging of the third layer 50 during extended operation, which clogging causes adverse pressure loss at the water outlet, especially where volume percentage of peat as filtering carrier material is chosen too high, lowering grain size and structural integrity, which provide excessive adsorption and/or adsorption capacity for the third layer 50. Clogging may lead to creation of channels within the filtering layer through waste water and/or waste gas can flow preferentially, thereby reducing purification efficiency. Although clogging can be reduced by using lower volume percentage of peat as filtering material with higher volume percentage of wood shaving as structural carrier material, filtering efficiency can be significantly affected. To obviate this problem, volume percentage of peat composing the first layer 46 is selected within a higher range than the corresponding range used for the third layer 50, to provide desired efficiency. Since percentage of suspended solids remaining in the water flow leaving the second layer 48 is significantly lower that percentage previously found in incoming waste water, higher volume percentage of peat as filtering carrier material in the first layer yields to increased filtering capacity to retain most of remaining suspended solids, which is no longer in sufficient concentration to adversely clog the first layer.

According to a variant of the embodiment shown in FIG. 1, a single filtering layer 46 or 50 can be used, which shows increasing gradient of volume percentage of filtering carrier material throughout that single layer in a direction toward the water outlet. Such single layer can be build through superposition of successive sub-layers showing decreasing percentage volume of filtering carrier material such as peat and increasing percentage volume of structural carrier material such as wood shavings.

In a preferred embodiment, the peat used in the biofilter is treated physically and/or chemically in order, for example, to eliminate problems including but not limited to color-leaching or clogging. The peat fibers are selected as having a Von Post index of 2 to 6, preferably of 3 to 4, compactness of about 0.68, density from about 100–110 $Kg/m^3$, porosity of about 0.9, specific area of about 200 $m^2/g$, and grain size of about 0.5–1 cm. In yet another embodiment, the peat fibers are mixed with a pre-determined concentration of $CaCO_3$ or equivalent and a pre-determined concentration of Fe-containing compound or equivalent. The addition of lime and iron-containing compounds allows efficient elimination of total phosphorus from the waste water and avoids color leaching problems.

It is also contemplated that the filtering material contains materials counteracting acidification thereof. Examples of such materials includes pH-reducing alkaline substances such as marl, limestone and calcium carbonate.

In the preferred embodiment depicted in FIG. 1, the filtering material is solely comprised of organic material which can be composted. However, as previously mentioned, filtering carrier material such as activated carbon and different types of structural carrier material can also be used. It is to be understood that the composting of the organic filtering material should take into account the type of pollutant having been filtered therein (i.e.: heavy metals and toxic wastes). Furthermore, the stones 40 can be washed separately from the filtering material and re-used. In yet another preferred embodiment, the stones are calcareous stones and hence improve the deacidification of the water reaching the water outlet pipe 16.

The quality of the microorganism population with which the reactor will be inoculated depends on the composition of the waste waters and/or waste gases to be purified. While it is contemplated that the filtering material 38 of the biofilter 1 will be inoculated by the microorganism population present in the waste waters and/or waste gases, specific microorganisms suited to the purification of specific pollutants (such as toxic substances) can be chosen and inoculated in the biofilter. As well, they can be mixed-in with the filtering material at the time of setting up of the biofilter.

It is also contemplated that in certain situations, a plurality of biofilters may be connected to one another in series. If desired, the different biofilters connected to one another, can be adapted to purify different types of waste waters and/or waste gases. Also contemplated is a pre-treatment of the waste waters to be purified through the biofilter of the present invention, the pretreatment being effected by conventional methods such as by using a septic tank, or a pond.

It should be understood, that the special geometry of the different layers can be varied according to the need and the aimed performance of the biofilter. Thus, the design of the different layers inside the biofilter will be based on the aimed efficacy of the purification of the pollutants to be purified, as well as the desired rate of filtration. For example, therefore, more layers could be added, resulting for example in a decreased rate of filtration, without a decrease in efficacy. Conversely, the number of layers could be reduced, thereby increasing the rate of filtration. Since some pollutants are easier to purify than others, a reduction in the number of layers could still permit an efficacious purification of a specific type of pollutant. The filtering composition of the present invention is preferentially chosen so as to ensure the maximum structural stability of the biofilter, for example by avoiding compaction and clogging, and also to limit temporal discharge of pollutants adsorbed to the filtering material. In a preferred embodiment, wood shavings and/or barks are used as structural carrier materials composing the biofilter layers. Wood shavings showing compactness of about 0.52, density from about 140–160 $Kg/m^3$, porosity from about 0.89–0.9, and grain size of about 2–5 cm can be used. Coniferous barks showing compactness of about 0.61, density from about 170–220 $Kg/m^3$, porosity from about 0.85–0.88, and grain size of about 2–5 cm can be used. Alternately, sawdust showing compactness of about 0.65, density from about 140–160 $Kg/m^3$, porosity from about 0.89–0.9, and grain size of about 1–2 cm can also be used.

It is also contemplated, that the valve 15 of the water inlet pipe 12, could also be operated so as to deny access of water to the inside of the biofilter, once a sufficient humidity of the filtering material has been attained.

Figure 2:
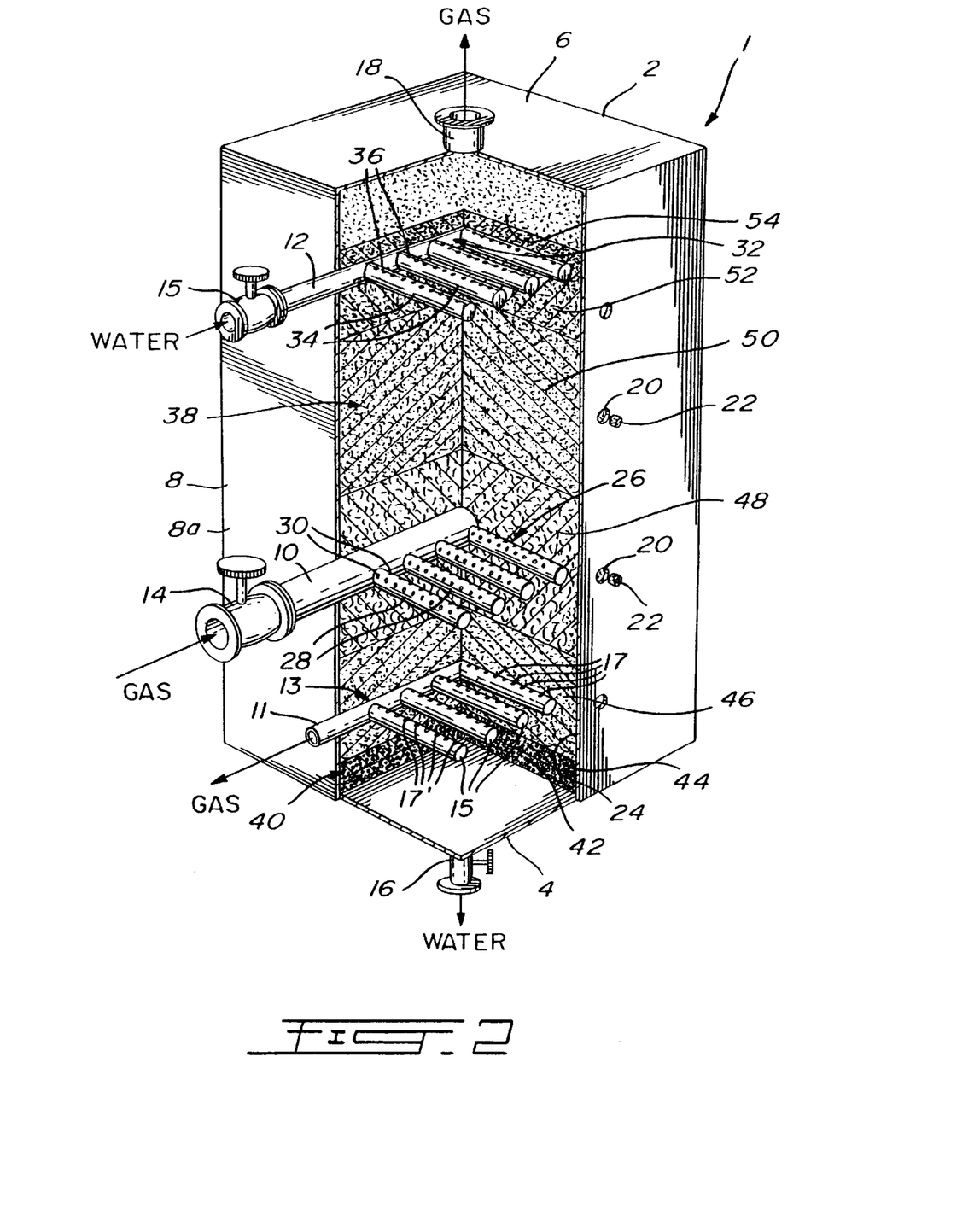
FIG. 2 illustrates a variant of the first embodiment shown in FIG. 1.

Referring now to FIG. 2, according to a variant of the first preferred embodiment of FIG. 1, it can be seen that the inlet pipe 10 is located to communicate to the a gas distributor 26 disposed within the second layer 48, and the biofilter 1 further comprises a lateral gas outlet tube 11 connected to a gas collector 13 disposed within the first filtering layer 46, which gas collector 13 is of a similar design than the gas distributor 10. The gas collector 13 has branches 15 provided with upper and lower series of perforations 17 and 17' that are respectively upwardly and downwardly oriented. Gas pressure loss that may otherwise occur through the whole filtering layer 46 is prevented by allowing the purified gas to flow out of the biofilter past the layer 48 and a portion of layer 46 through the gas collector 13. While lower perforations allow water entering upper perforations to pass downwardly through the collector 13, to be further purified through layer 46, gas flow resistance exerted on the purified gas entering the collector 13 through upper perforations 17 substantially prevents the purified gas to enter underneath portion of layer 46, thereby allowing the gas to leave the biofilter through the outlet tube 11. In that configuration, sufficient quantity of filtering material is present between gas distributor 26 and gas collector 13 to provide desired gas purification efficiency.

According to a variant of the embodiment shown in FIG. 2, the biofilter can be partially immersed to provide growth of anaerobic microorganisms capable of degrading specific polluting matter contained in the waste water, or to carry out denitrification, to complete purification thereof. In such case, the layers 42, 44, and a lower portion of the filtering layer 46 are caused to be immersed by controlling water flow leaving the biofilter using known flow control device 19 at outlet 16, thereby providing appropriate anaerobic condition to allow desired microorganisms to grow within immersed layers, and to purified water passing therethrough. The gas collector 11 being located just above the immersed portion of the layer 46, the gas is prevented to pass therethrough and is then allowed to leave the biofilter through outlet tube 11.

Figure 3:
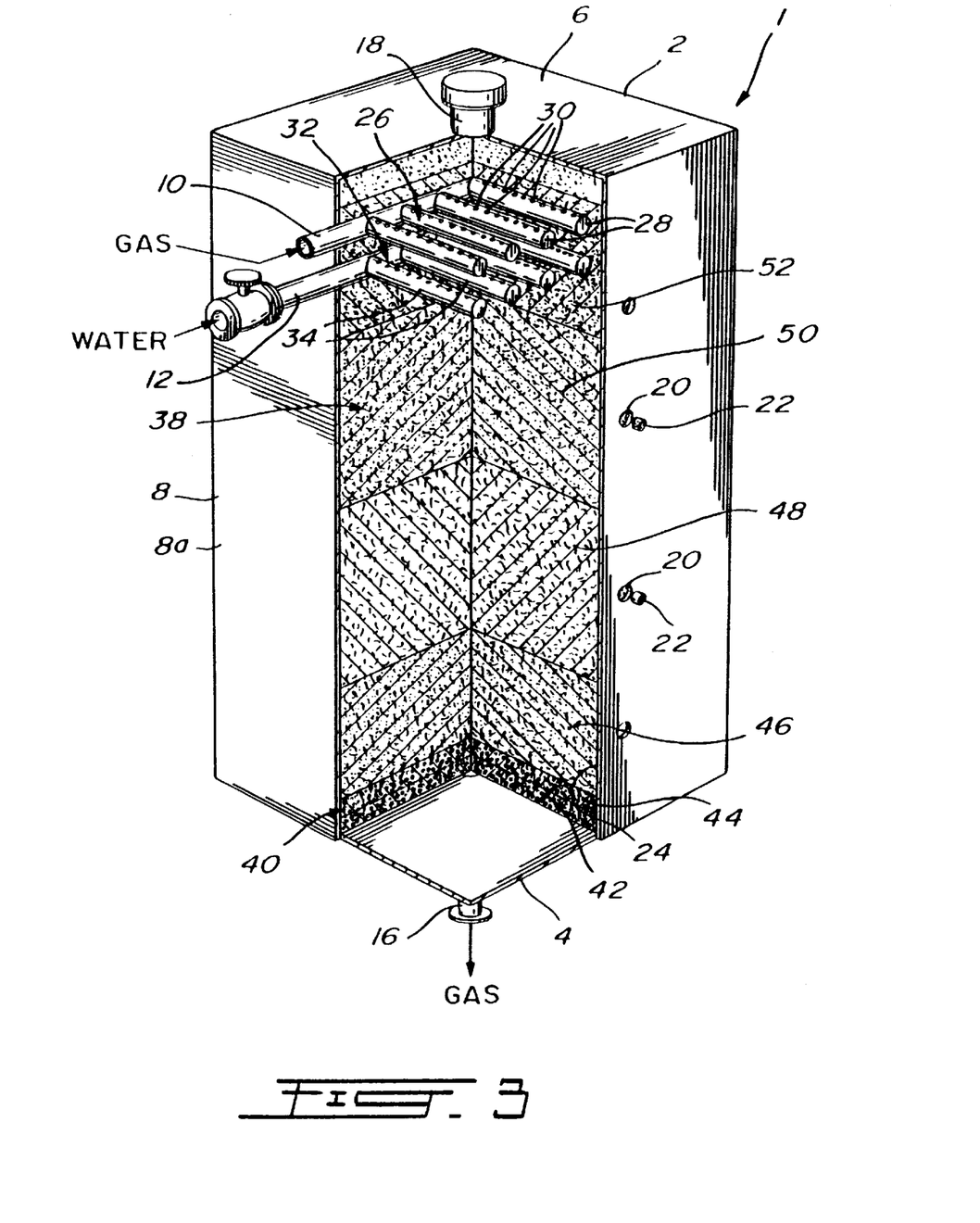
FIG. 3 is a fragmentary perspective view of a second preferred embodiment of a biofilter for the purification of water and gas according to the present invention, wherein water and gas move downwardly.

Referring now to FIG. 3, according to a second embodiment, the gas inlet pipe 10 of the biofilter 1 can be connected through the upper portion of the biofilter housing 2, with the corresponding gas distributor 26 disposed within the layer 52, preferably over the water inlet pipe 12 and water distributor 32. In such a parallel flow configuration, the uppermost filtering layer designated at numeral 54 in the embodiment shown in FIG. 1 can be omitted and the gas outlet pipe 18 in top wall 6 of the biofilter 1 would be omitted or blocked as shown in FIG. 3, so as to negate the exit of the waste gas therefrom, thereby forcing the movement of the gas downward. Alternately, the gas inlet 10 can be substituted for the gas outlet 18 and connected vertically to the gas distributor 26. In that embodiment, the gas and water can be recuperated simultaneously following their passage through the water outlet pipe 16 in bottom wall 4. The water flow in this configuration, provides the humidity required for optimum activity of the biofilter 1.

Figure 4:
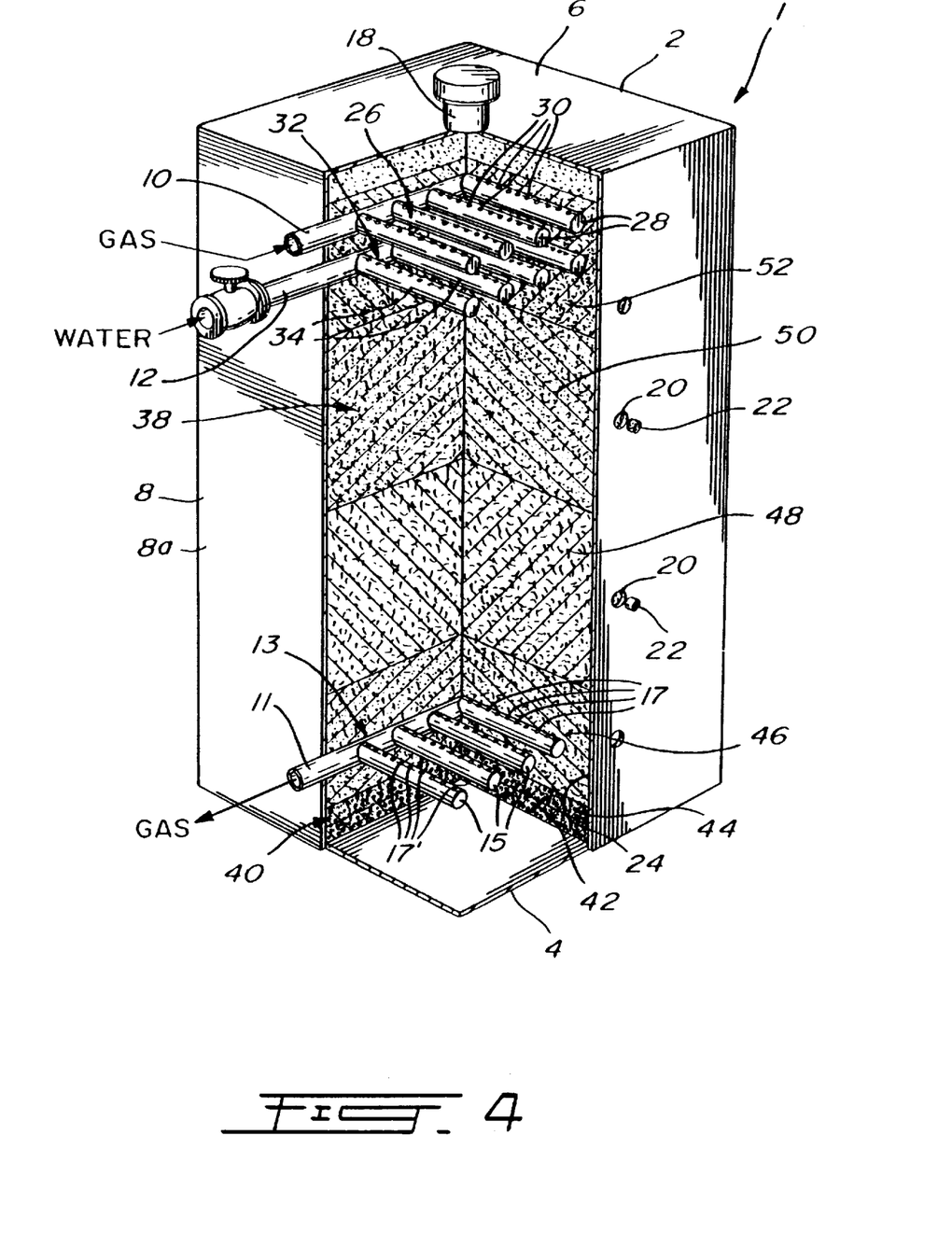
FIG. 4 illustrates a variant of the second embodiment shown in FIG. 1;.

Referring now to FIG. 4 and according to a variant of the embodiment shown in FIG. 3, there is illustrated a biofilter 1 of a similar construction than biofilter illustrated in FIG. 2, which is provided with a lateral gas outlet tube 11 connected to a gas collector 13 of a same construction as those described before with reference to FIG. 2, and working in a same way. Here again, the uppermost filtering layer designated at numeral 54 in the embodiment shown in FIG. 1 can be omitted. In that configuration, sufficient quantity of filtering carrier material is present between gas inlet 10 and gas outlet 11 to provide desired purification efficiency for both gas and water.

According to a variant of the embodiment shown in FIG. 4, the biofilter can be partially immersed in a same way than explained before with reference to FIG. 2, to provide growth of anaerobic microorganisms capable of degrading specific polluting matter contained in the waste water or to carry out denitrification, to complete purification thereof.

It is contemplated herein that the biofilter of the present invention could also be used to only purify waste waters or only waste gases. For the treatment of waste waters only, the access of the gas to the filtering material, through the gas inlet pipe 10, could be denied by operating the valve 14, as shown in FIG. 1. Alternatively, the gas coming in the gas inlet pipe, could be air from the environment as opposed to waste gases and could thus serve to aerate and mix the filtering material. Examples of biofilter composition data given in. Table 1 for each layer 46, 48, 50, 52 and 54 can be used for water filtering according to a preferred embodiment.

In a similar fashion, the biofilter of the present invention could also be used to solely purify waste gases. Referring again to FIG. 1, tap water or the like is provided through the water inlet pipe 12, thereby generating sufficient humidity inside the biofilter to permit an efficient purification of the waste gases. Table 2 gives examples of biofilter composition data for each layer 46, 48, 50, 52 , 54 and for an additional filtering layer preferably disposed between layers 52 and 54 in terms of volume percentage ranges of constituents and thickness ranges for corresponding layers, which examples are applicable to filtering of gas only.

TABLE 2

| Biofilter composition -upward flowing gas only | Peat (volume %) | Wood Shavings (volume %) | Barks (volume %) | Thickness (cm) |
|---|---|---|---|---|
| sixth layer | — | — | 100 | 10–20 |
| fifth layer | 20–80 | 50–80 | — | 30–60 |
| fourth layer | — | 100 | — | 10–30 |
| third layer | 20–50 | 50–80 | — | 30–60 |
| second layer | — | 100 | — | 20–40 |
| first layer | 50–80 | 20–50 | — | 10–30 |

Here again, for each layer, any combination of volume percentage of constituents falling within the given ranges can be used to obtain a total 100% volume for that layer. It can be seen from Table 2 that peat or wood shaving can be also added to bark to obtain the layer fifth 54. It can be seen that volume percentage range for peat in third layer 50 is lower than volume percentage range for peat composing first layer 46, to improve filtering efficiency in capturing condensation of polluting matter contained in waste gas, without causing any further pressure loss of the gas raising through the biofilter.

Similarly, returning to FIG. 3, downwardly moving waste gas can be filtered using composition data as given in Table 3.

TABLE 3

| Biofilter composition -downward flowing gas only | Peat (volume %) | Wood Shavings (volume %) | Thickness (cm) |
|---|---|---|---|
| fourth layer | — | 100 | 20–40 |
| third layer | 20–50 | 50–80 | 30–60 |
| second layer | — | 100 | 10–30 |
| first layer | 20–50 | 50–80 | 30–60 |

It can be seen from Table 3 that an uppermost layer of barks is not used, and that a lowermost condensation capturing layer is not necessary.

According to a further embodiment, the filtering composition can be directly disposed over a source of waste gas confined under the filtering material. In such an open-type configuration, the biofilter is provided without a housing containing the filtering composition. It is contemplated therefor that water is supplied to the filtering composition to provide the necessary humidity for optimum filtration activity. The source of water can be naturally (i.e. rain) or artificially supplied. A sufficient amount of filtering material should preferably be present beneath the source of waste gas, to trap contaminated humidity or water, thereby avoiding a contamination of the soil or of the ground water.

It is to be understood that in embodiments for waste gas filtration, the water which is supplied to provide the required humidity can be supplemented with nutrients and/or inoculum.

It should be understood, that in another embodiment, suitable in certain situations, the biofilter has an opened-type configuration. Referring to FIG. 1, such an open-air biofilter is not provided with a top wall 6, and the upper portions of side walls 8, thereby form the gas outlet. In certain situations, a control of the temperature of the incoming water and/or gas might be advantageous.

The invention will now be described by way of the following examples:

EXAMPLE 1

Simultaneous filtration of waste waters and waste gases

A biofilter according to a preferred embodiment of the invention was used, the biofilter consisting of a plastic housing of 76 cm long, 61 cm wide and 125 cm high. A tap was connected to the water outlet so as to permit a sampling of the water reaching same. Eight openings, four on two different side walls, and provided with removable caps, permitted the sampling of the filtering material and to perform the measurements relating to the purification. The four openings on a particular side wall were located 10, 35, 60 and 85 cm above the bottom wall of the biofilter. The bottom wall of the biofilter was also provided with wheels so as to make it mobile and more easily transportable.
Characterization of the waste waters and waste gases Inside, the biofilter comprises two layers of stones of 5 cm, the bottom layer being composed of calcareous stones having diameters of approximately 9 mm and the second layer of calcareous stones having diameters of approximately 6 mm. The first layer of filtering material 46 is composed of a filtering carrier material comprising a mixture of 38 liters of wood shavings, 110 liters of peat (peat 62.5%, wood shavings 37.5%), 1.6 kg of $FeCl_3$, 5.5 kg of $CaCO_3$ and two liters of inoculum. Samples from existing biofilters can also be used as the inoculum. The thickness of this first layer is approximately 30 cm. The second layer of filtering material 48 is approximately 15 cm thick and is composed of a structural carrier material comprising wood shavings containing two liters of inoculum. The third layer of filtering material 50 is approximately 30 cm thick and composed of a filtering carrier material comprising 128 liters of wood shavings, 70 liters of peat (wood shavings 62.5%, peat 37.5%), 0.75 kg $FeCl_3$, 2.6 kg $CaCO_3$ and two liters of inoculum. The fourth layer of filtering material 52 is of thickness of approximately 10 cm and composed of a structural carrier material comprising 50% wood shavings and 50% coniferous bark. The uppermost layer of filtering material 54 is approximately 20 cm thick and solely composed of coniferous bark.

The waste water used was prepared from concentrated lexiviate of bovine manure. Three mixtures were prepared from this concentrated lexiviate, having different organic charges of 0.05, 0.08 and 0.12 kg $BOD_5/m^3$ day. These mixtures were obtained by adding water to the concentrated lexiviate. The water used had an average residual content of chlorine of 0.2 mg/l. The flow of the lexiviate in the biofilter was maintained at 50 L/d.

The waste gas used came from a tent in which pig manure was stored. In order to ensure sufficient concentration of odor, the pig manure was changed three times a week, continuously mixed and is pH increased in order to favor the liberation of the odorous components. These components are members of a large molecular family including: volatile organic acids, aldehydes, ketones, esters, amines, sulfides, mercaptans, phenols and nitrogenous heterocyclic components. The air flow tested were of 50, 100 and 250 $m^3/h$.
Methods and analysis The collection of liquid sample was carried out twice a week. Samples were taken at the entry of the biofilter as well as at its exit and were submitted to the following analyses: chemical oxygen demand (COD), total suspended solids (TSS), color and pH. These analyses were carried at every sampling. Other analyses were carried out once a week these included: 5-days biochemical oxygen demand ($BOD_5$), nitrite, nitrate and fecal coliforms. All these analyses were conducted in accordance with standard methods (APHA, 1989).

The analysis of the incoming gases was carried out by two methods. The first method relied on a calorimetric analysis using Draeger reagents as described by (*Draeger Detector tube handbook,* Aug. 31, 1990, Ed. National Draeger Inc.). Briefly, the gases are directly pumped through a tube containing a reagent and a phase whose color is dependent on a specific odorous product. The intensity of the coloration in the graduated tube permits an estimation of the concentration of this odorous product. The sampling was carried out twice a week and samples were collected at the entry and at the exit as well as inside the biofilter by using the eight openings on the side walls thereof.

A second analysis to evaluate the efficiency of the odor treatment consisted in an evaluation by a jury of the odors dissipated from a piece of paper which had been exposed for 24 hours at the entry or at the exit of the biofilter. The odors were qualitatively evaluated. This analysis was carried out twice a week.

Other information such as temperature of the gas and water at the entry and exit, humidity of the gas inside the biofilter, water flow inside the biofilter and loss of charge were obtained daily.
Results The biofilter of the present invention permitted obtaining of gas flows of up to 250 $m^3/h$. The pH of the water coming out of the biofilter was shown to be relatively constant throughout the experimentation, at about pH 7; furthermore, the temperature of the samples corresponded to the surrounding temperatures and thus, to approximately 20° C. In general, a comparison of the total suspended solids and of the five days biochemical oxygen demand between the entry and the exit from the biofilter showed a purification efficiency of above 90%. For the chemical oxygen demand, the purification efficiency was in the order of 77%. However, it appears that the system offers a better efficiency for a COD at the entry of approximately 2,000 mg $O_2/l$. Generally, the purification efficiency of the biofilter for phosphate was superior to 90%, although the biofilter appears to be more efficient for a phosphate concentration at the entry point which is inferior to 50 mg/l. The purification efficiency of the biofilter was in general shown to be superior to 97%. The biofilter did not display temporal discharge problems associated with other types of treatment systems. The relative humidity of the filtration material was measured at being approximately 81%. The ammonia gas was shown to be purified on average to 93%. Finally, by the sensorial evaluation of the odor, the purification efficiency of the waste gases was evaluated as being close to 100%.

In summary, therefore, the biofilter of the resent invention displays excellent purification profiles for the simultaneous treatment of waste waters and waste gases.

EXAMPLE 2

Filtration of waste gases only

In another embodiment, a biofilter comprising solely organic material which can be composted was used to generate a biofilter for the purification of waste gases. One such embodiment comprises, for example, a biofilter having a volume of 1 $m^3$, comprising an approximately 10 cm layer of a filtering carrier material comprising a mixture of peat and wood shavings at the bottom (80% peat, 20% wood shavings). This first layer serves to capture the condensation of the waste gases coming into the biofilter. The biofilter was provided with a waste gas distributor, on top of the first layer. The gas distributor being, for example, of the type described for the biofilter for the simultaneous purification of waste waters and waste gases. The waste gas distributor was covered with a layer of a structural carrier material comprising wood shavings, (the second layer) thereby favoring a good distribution of the waste gases throughout the biofiltering material. The third layer consisted of a filtering carrier material comprising a mixture of peat and wood shavings (37.5% peat, 62.5% wood shavings) of approximately 40 cm, above which an approximately 20 cm layer of structural carrier material comprising wood shavings was present. This fourth layer served to minimize the risk of the creation of preferred channels through which the waste gases can freely pass, thereby reducing the efficiency of the purification. Another layer of a filtering carrier material having approximately 40 cm and comprising a mixture of peat and wood shavings (similar to the third layer), and a layer of approximately 20 cm of coniferous bark which serves as an insulator and/or deodorizer were present. The biofilter for the filtration of waste gases was humidified by percolating water thereinto, either continuously or periodically, and it can be prepared using a filtering material which has been previously humidified. For example, the peat could have been sufficiently humidified before the laying out of the different layers.

EXAMPLE 3
Purification of waste waters only

In another embodiment, a biofilter consisting solely of organic material which can be composted, rests on a layer of stones, preferably calcareous stones, similar to those found at the bottom of the biofilter for the simultaneous purification of waste waters and waste gases. On these stones lies a layer of a filtering carrier material having approximately 100 cm and comprising of peat and wood shavings (peat 62.5%, wood shavings 37.5%). A layer of a structural carrier material comprising wood shavings and bark, preferably coniferous bark (50% wood shavings, 50% bark) rests on top of the wood shaving/peat layer and provides a means to ensure a good distribution of the waste water throughout the filtering material. Waste water can be fed by spraying, or by a water distributor such as described in the biofilter for the simultaneous purification of waste waters and waste gases. A flow of air is externally supplied to provide oxygen required for colonization and growth of aerobic microorganisms. It is to be understood that a layer of approximately 20 cm of 100% coniferous bark, preferably coniferous bark and peat, could be present on top of the spraying device or water distributor so as to insulate and/or deodorize the biofilter.

EXAMPLE 4
Permeable membrane distributor

Figure 5:
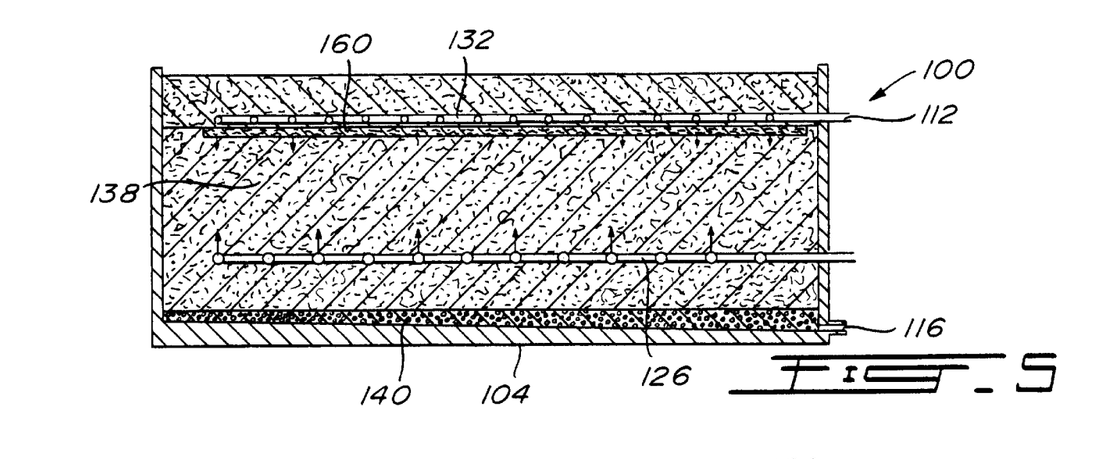
FIG. 5 is a schematic representation of a third preferred embodiment of a biofilter for the purification of water and gas according to the present invention.

In a further embodiment, as illustrated in FIG. 5, the water inlet 112 is connected to a water distribution means that may consist of a water distributor 132 and/or a permeable membrane 160. The waste water is absorbed into the membrane 160 and passes through evenly distributing the waste water into the filtering material 138.

The waste water is then filtered by the filtering media 138 passing therethrough and is collected in layer 140 supported by the bottom wall 104, which layer 140 is preferably consisting of stones to drain the filtered water through the water outlet 116.

The membrane suitable for the present invention should be permeable and may preferably allow for the capillarity of the water.

An example of a suitable membrane may be preferably, but not restricted to, geotextile produced by TEXEL INC. Such geotextile as tested has the following characteristics:

thickness: 2.5 mm;
density: 250 g/m$^2$;
absorption capacity: 15 times its weight in water; and
vertical capillarity: 3 cm.

Figure 6:
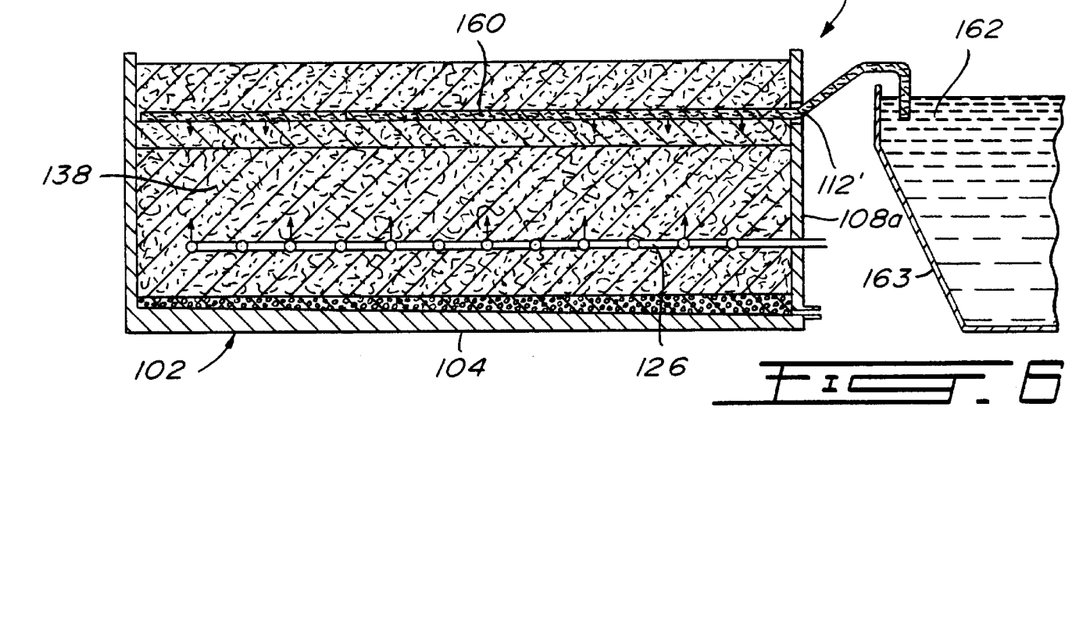
FIG. 6 is a schematic representation illustrating a variant of the third preferred embodiment shown in FIG. 5.

As illustrated in FIG. 6, the membrane 160 may also extends outside the biofilter 100 in order to be in contact with the waste water 162 to be filtered contained in a trough or vessel 163. According to a variant of the present invention, the waste water to be filtered can be contained in a cavity formed at the periphery of the biofilter 100 to form an integral part thereof. In both cases, the water inlet 112 is replaced by an opening 112' to let the membrane pass through the side wall 108a of the housing 102. Accordingly, the waste water 162 is absorbed by the membrane 160 and is brought to the filtering media 138 by capillarity.

It is to be understood that such membrane could also be used for distributing evenly the gas to be filtered. Therefore, the gas distribution means 126 could also be replaced by such a membrane in both embodiments shown in FIGS. 5 and 6.

Except for the water distribution means and/or the water inlet, the functions and operations are identical to previous embodiments described above.

While the invention has been described with particular reference to the illustrated embodiments, it will be understood that numerous modifications thereto will appear to those skilled in the art. Accordingly, the above description and accompanying drawing should be taken as illustrative of the invention and not in a limiting sense.

What is claimed is:

1. Apparatus for the purification of waste water with oxygen-containing gas, comprising:

a) a housing comprising bottom and side walls;

b) a gas inlet located in a lower portion of the housing and a water inlet located in an upper portion of the housing, the gas inlet being connected to a gas distributor and the water inlet being connected to a water distributor, the gas distributor and water distributor being located inside the housing;

c) a water outlet located below the gas inlet, and a gas outlet located in the upper portion of the housing;

d) a filtering material contained inside the housing for providing adsorption and/or absorption of the waste water, ionic exchange capacity with the waste water, nutrients and support for colonization and growth of microorganisms adapted to biofilter contaminants contained in the waste water in contact with the gas, said filtering material comprises a succession of layers, said succession of layers comprising at least one layer including a filtering carrier material and at least one layer including a structural carrier material in a sufficient amount to prevent compaction of the filtering material and channels formation; whereby the waste water and the gas can flow, thereby ensuring purification of said waste water;

wherein the gas supplied through the gas inlet substantially moves upward through the filtering material to escape by the gas outlet and the waste water supplied through the water inlet moves downward through the filtering material to escape by the water outlet, and wherein the filtering material is characterized by downwardly increasing biofiltration capacity to prevent clogging of the filtering material upon downward flow of the waste water.

2. The apparatus of claim 1, wherein said oxygen containing gas is a waste gas, said filtering material further providing adsorption and/or absorption of the waste gas, ionic exchange capacity with the waste gas, nutrients and support for colonization and growth of microorganisms adapted to biofilter contaminants contained in the waste gas, said filtering material thereby further ensuring purification of the waste gas and wherein sufficient filtering material is present between the gas inlet and water outlet to ensure purification of water contaminated by incoming waste gas, the gas distributor distributing most of the gas upwardly and a remaining portion of the gas downwardly allowing for the colonization and growth of the microorganisms within the filtering carrier material present between the gas inlet and the water outlet.

3. The apparatus of claim 2, further comprising a gas collector located inside the housing and under the filtering material present between the gas inlet and the water outlet, for collecting the remaining portion of the gas.

4. The apparatus of claim 3, wherein said filtering material extends under the gas collector, said water outlet being provided with a flow control device for causing immersion of the filtering material under the gas collector to provide anaerobic condition for colonization and growth of other microorganisms adapted to degrade the contaminants contained in the waste water, for further purifying the waste water.

5. The apparatus of claim 1, wherein at least one layer of structural carrier material comprises wood shavings.

6. The apparatus of claim 1, wherein there are at least one upper layer including filtering carrier material and at least one lower layer including filtering carrier material, said upper layer being of substantially lower biofiltration capacity than said lower layer.

7. The apparatus of claim 6, wherein said upper layer of filtering carrier material comprises from about 20% to about 50% by volume of peat.

8. The apparatus of claim 7, wherein the upper layer further comprises from about 50% to about 80% by volume of structural carrier material.

9. The apparatus of claim 8, wherein the structural carrier material is wood shavings.

10. The apparatus of claim 7, wherein the lower layer comprises from about 50% to about 70% by volume of peat.

11. The apparatus of claim 10, wherein the lower layer further comprises from about 30% to about 50% by volume of structural carrier material.

12. The apparatus of claim 1, wherein the filtering material essentially consists of organic material, thereby permitting composting of the filtering material following the filtering of the waste water.

13. The apparatus of claim 12, wherein the filtering carrier material is peat.

14. The apparatus of claim 1, further comprising an uppermost deodorizing and/or insulating layer.

15. The apparatus of claim 14, wherein the uppermost deodorizing and/or insulating layer comprises coniferous bark.

16. The apparatus of claim 1, further comprising a top wall connected to the side walls and closing the housing.

17. The apparatus of claim 1, wherein microorganisms are inoculated in the filtering material.

18. The apparatus of claim 1, further comprising a lowermost structural layer of stones for supporting the filtering material.

19. The apparatus of claim 1, wherein the water distributor, the gas distributor or both comprise a permeable membrane capable of capillarity.

20. An apparatus for the purification of waste water and/or oxygen-containing waste gas, comprising:
   a) a housing comprising bottom and side walls;
   b) a gas inlet and a water inlet located in an upper portion of the housing, the gas inlet and the water inlet being connected respectively to a gas distributor and a water distributor located inside the housing;
   c) a water outlet and a gas outlet located in a lower portion of the housing;
   d) a filtering material contained inside the housing for providing adsorption and/or absorption of the waste water or waste gas, ionic exchange capacity with the waste water or the waste gas, nutrients and support for colonization and growth of microorganisms adapted to degrade contaminants contained in the waste water or waste gas, said filtering material comprises a succession of layers, said succession of layers comprising at least one layer including a filtering carrier material and at least one layer including a structural carrier material in a sufficient amount to prevent compaction of the filtering material and channels formation whereby the waste water and/or waste gas can flow, thereby ensuring purification thereof;
   wherein gas and water are supplied respectively through the gas inlet and the water inlet and move downward through the filtering material to escape respectively by the gas outlet and the water outlet; and
   wherein the filtering material is characterized by downwardly increasing filtration capacity to prevent clogging of the filtering material upon downward flow of the waste water.

21. The apparatus of claim 20, further comprising a gas collector connected to the gas outlet and located within the filtering material over the water outlet for collecting purified gas.

22. The apparatus of claim 21, wherein said filtering material extends under the gas collector, said water outlet being provided with a flow control device for causing immersion of the filtering material under the gas collector to provide anaerobic condition for colonization and growth of other microorganisms adapted to degrade the contaminants contained in the waste water, for further purifying the waste water.

23. The apparatus of claim 20, wherein at least one layer of structural carrier material comprises wood shavings.

24. The apparatus of claim 20, wherein there are at least one upper layer including filtering carrier material and at least one lower layer including filtering carrier material, said upper layer being of substantially lower filtration capacity than said lower layer.

25. The apparatus of claim 24, wherein the upper layer of filtering carrier material comprises from about 20% to about 50% by volume of peat.

26. The apparatus of claim 25, wherein said upper layer further comprises from about 50% to about 80% by volume of structural carrier material.

27. The apparatus of claim 25, wherein said lower layer comprises from about 50% to about 70% by volume of peat.

28. The apparatus of claim 27, wherein said lower layer further comprises from about 30% to about 50% by volume of structural carrier material.

29. The apparatus of claim 26, wherein said structural carrier material is wood shavings.

30. The apparatus of claim 20, wherein the filtering material essentially consists of organic material, thereby permitting composting of the filtering material following the filtering of the waste water and/or waste gas.

31. The apparatus of claim 30, wherein the filtering carrier material is peat.

32. The apparatus of claim 20, wherein microorganisms are inoculated in the filtering material.

33. The apparatus of claim 20, further comprising a lowermost structural layer of stones supporting the filtering material.

34. The apparatus of claim 20, wherein the water distributor, the gas distributor or both comprise a permeable membrane capable of capillarity.

35. A filtering composition for the purification of waste water with oxygen-containing gas, said filtering composition providing adsorption and/or absorption of the waste water, ionic exchange capacity with the waste water, nutrients and support for colonization and growth of microorganisms adapted to biofilter contaminants contained in the waste water in contact with the gas, the filtering composition comprising a succession of layers, said succession of layers comprising at least one layer including a filtering carrier material and at least one layer including a structural carrier material in a sufficient amount to prevent compaction of the filtering material and channels formation whereby the waste water and the gas can flow, thereby ensuring purification of the waste water, wherein the filtering composition is characterized by increasing biofiltration capacity in a direction of flow of the waste water to prevent clogging of the filtering composition upon flow of the waste water.

36. The filtering composition of claim 35, wherein said structural carrier material is wood shavings.

37. The filtering composition of claim 35, wherein there are at least one first layer including filtering carrier material and at least one second layer including filtering carrier material, said first layer being of substantially lower biofiltration capacity than said second layer.

38. The filtering composition of claim 37, wherein said first layer of filtering carrier material comprises from about 20% to about 50% by volume of peat.

39. The filtering composition of claim 38, wherein said first layer further comprises from about 50% to about 80% by volume of structural carrier material.

40. The filtering composition of claim 39, wherein said structural carrier material is wood shavings.

41. The filtering composition of claim 38, wherein the second layer comprises from about 50% to about 70% by volume of peat.

42. The filtering composition of claim 41, wherein said second layer further comprises from about 30% to about 50% by volume of structural carrier material.

43. The filtering composition of claim 35, wherein the filtering material consists essentially of organic material, thereby permitting a composting of the filtering material following the filtering of waste water.

44. The filtering composition of claim 43, wherein the filtering carrier material is peat.

45. The filtering composition of claim 35 wherein microorganisms are inoculated in the filtering material.

46. A method for the purification of waste water with oxygen-containing gas, comprising:

a) providing a biofilter capable of providing adsorption and/or absorption of the waste water, ionic exchange capacity with the waste water, nutrients and support for colonization and growth of microorganisms adapted to biofilter contaminants contained in the waste water in contact with the gas, the biofilter comprising a succession of layers, said succession of layers comprising at least one layer including a filtering carrier material and at least one layer including a structural carrier material, said structural carrier material being in a sufficient amount to prevent compaction of the filtering material and channels formation whereby the waste water and the gas can flow, thereby ensuring purification of the waste water; wherein said biofilter is characterized by increasing biofiltration capacity in a direction of flow of the waste water to prevent clogging of said biofilter upon flow of the waste water;

b) passing the waste water through said biofilter.

47. The method of claim 46, wherein said structural carrier material comprises wood shavings.

48. The method of claim 46, wherein there are at least one first layer including filtering carrier material and at least one second layer including filtering carrier material, said first layer being of substantially lower biofiltration capacity than said second layer.

* * * * *